(No Model.)
H. A. LOEW.
CYCLOMETER.
No. 537,896. Patented Apr. 23, 1895.
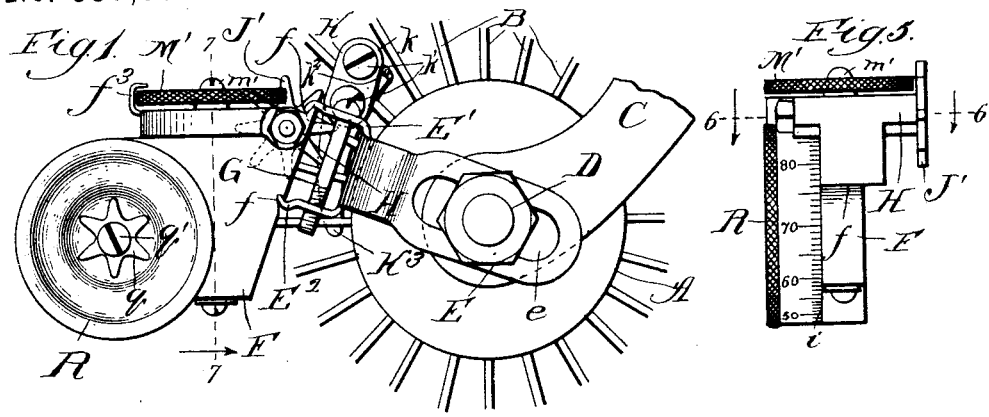
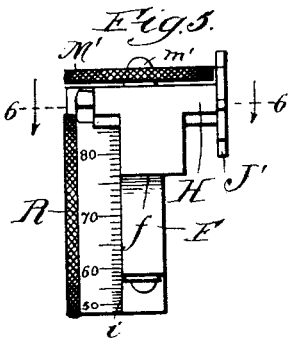
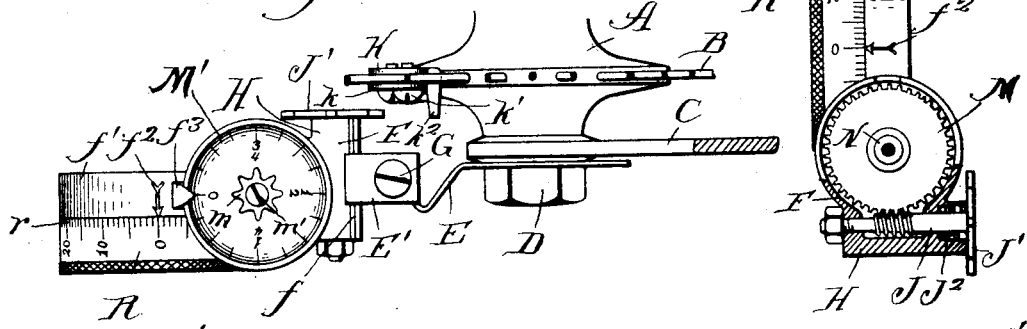
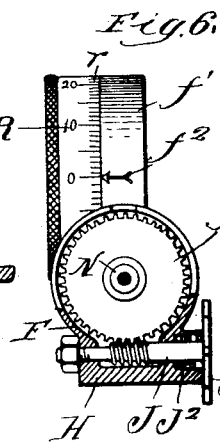
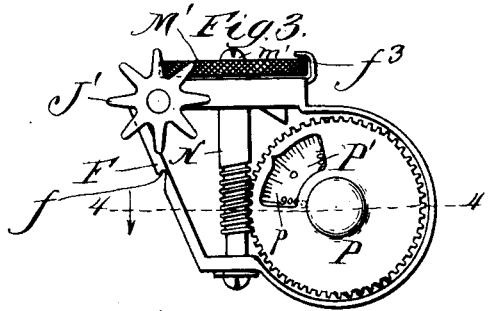
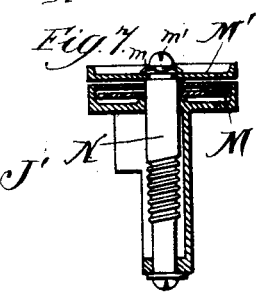
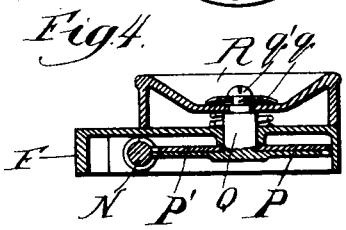
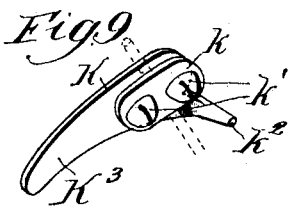
Witnesses:
Harris White,
Florence King.
Inventor:
Henry A. Loew
By Walter H. Chamberlin
Atty

UNITED STATES PATENT OFFICE.

HENRY A. LOEW, OF CHICAGO, ILLINOIS.

CYCLOMETER.

SPECIFICATION forming part of Letters Patent No. 537,896, dated April 23, 1895.

Application filed May 14, 1894. Serial No. 511,173. (No model.)

*To all whom it may concern:*

Be it known that I, HENRY A. LOEW, a citizen of the United States, residing at Chicago, county of Cook, State of Illinois, have invented certain new and useful Improvements in Cyclometers; and I declare the following to be a full, clear, and exact description of the invention, such as will enable others skilled in the art to which it pertains to make and use the same, reference being had to the accompanying drawings, which form a part of this specification.

My invention has for its object the production of a cyclometer which shall be positive in its action; one in which there shall be a total adder wheel, a local indicator dial or pointer traveling therewith but adjustable independent thereof, and another dial or pointer independent of either of the above for indicating the divisions of a mile; one in which the parts are small in number and simple in construction, and consequently a cyclometer not liable to get out of order.

The invention consists in a combination of devices and appliances hereinafter described and claimed.

In the drawings, Figure 1 is a side elevation of a portion of a bicycle wheel and my cyclometer attached thereto. Fig. 2 is an edge elevation of the same. Fig. 3 is a side elevation of a portion. Fig. 4 is a sectional view on the line 4—4 of Fig. 3. Fig. 5 is an edge elevation of a portion with parts removed. Fig. 6 is a sectional view on the line 6—6 of Fig. 5. Fig. 7 is a sectional view on the line 7—7 of Fig. 1. Figs. 8 and 9 are perspective views of parts.

In carrying out the invention A represents the hub of the wheel of a bicycle; B, the spokes thereof; C, the standard or fork; D, the nut on the end of the wheel axle.

E is the supporting arm of my cyclometer provided with a slot $e$ adapted to embrace the axle. Now as will be seen by removing the nut D and slipping the arm E onto the axle and then replacing the nut the cyclometer is held firmly in place. The end of the arm E terminates in two arms $E'$, $E^2$.

F is a suitable supporting piece preferably made of cast metal, although not necessarily so. It is provided with two notches or grooves $f$ which the arms $E'$ $E^2$ engage. The engagement is perfected by the screw G extending from arm to arm and binding the arms down into the notches. Thus the engagement forms an adjustment whereby the body of the cyclometer may be adjusted relative to the spokes of the wheel.

H is a suitable bearing carried by or formed in the supporting piece F, and J is a worm shaft extending through the same (see Fig. 6) and provided on its end with a sprocket wheel $J'$, a spring $J^2$ being provided to increase the friction and thus prevent the wheel from moving more than the desired distance. Carried by the spokes of the wheel is an arm K engaged to the spokes by the plate $k$ and screws $k'$, the plate $k$ and arm K forming a clamp to engage the spoke and between which the spoke is clamped and the extension $K^3$ of the arm forming a bearing against the adjacent spokes to prevent a rotation on the spoke. Carried by the arm is a finger $k^2$ which as the wheel revolves engages the sprocket wheel $J'$ and moves it one notch or tooth. Thus for every revolution of the bicycle wheel the sprocket wheel $J'$ is moved one tooth or notch. Meshing with the worm J is a gear M. This gear M together with the dial $M'$ are mounted upon the worm shaft N, the gear M being keyed to said shaft, while the dial $M'$ is held thereto by the spring washer $m$ and the screw $m'$. Meshing with the worm N are two gears P, $P'$. These gears are mounted upon the shaft Q, the gear P being integral with or engaged to the shaft while the gear $P'$ revolves thereon. Engaged to the shaft Q by the friction washer $q$ and screw $q'$ is a dial R. The gear P is provided with I will say one hundred teeth, while the gear $P'$ is provided with one less, or in this case ninety-nine teeth. On the face $f'$ of the supporting piece F is a pointer $f^2$ and the rim of the dial R is provided with graduations $r$, the rim in this case being so graduated that each mark represents one mile.

It will be seen by the foregoing description that the dial $M'$ and the dial R are both loose on their respective shafts but are held thereto by friction washers so that the dials can be revolved and set at any particular point independent of their respective shafts. It will also be observed that by virtue of the fact that the dial $P'$ has one less tooth within the dial P it will upon one revolution of the dials gain one tooth in position. Consequently by graduating the face of the dial P' each mark to represent one hundred miles the total number of miles traveled by the machine will be registered.

I will now explain the operation. The arm K on the wheel at each revolution will strike a sprocket on the sprocket wheel J' and revolve it a corresponding distance. This revolves the worm J which in turn revolves the gear M and dial M'. This dial M' as will be seen in the present case is divided into the graduations of a mile so that one revolution of this dial M' represents the distance of a mile having been traveled. A pointer $f^3$ carried by the case serves as an indicator. The revolution of the shaft N on which the gear M is mounted revolves the gears P, P' and the revolution of the shaft Q on which these gears are mounted revolves the dial R. Consequently for every revolution of the gear M and the dial M' the gears P, P' are revolved one tooth or graduation, thus indicating on the dial R the number of revolutions of the mile dial M'. Now by the difference in the number of teeth on the gears P, P' every complete revolution of the gear P will be indicated on the gear P' through the opening $p$. If at any time the rider desires to set the mile dial M' to zero, or the one hundred mile dial R to zero, he has only to revolve them to the proper points keeping the total number of miles traveled by the machine on record by the dial P'.

It is obvious that various details of my device might be altered. For instance, the dials M', R, might instead be pointers with fixed graduated dials on the case. So also the dial M' might be dispensed with and the distance traveled could be recorded on the dial R. These various changes and many others might be made without departing from the spirit of my invention which consists essentially in the provision of the gears P, P' one gear having one less notch or tooth than the other, and the indicator such as R adjustable independent of said gears, but ordinarily traveling therewith. So also while I have herein spoken of the gear P' having one less tooth than the gear P yet it is obvious that the gear P' might have one more tooth than the gear P and such a variation I would be understood as covering by my claims.

What I claim is—

1. In a cyclometer the combination of a worm shaft and means between the shaft and wheel of the machine to adapt it to revolve the worm shaft, a gear meshing with said worm shaft, said gear itself mounted upon a worm shaft, a dial carried by said last named shaft, but adjustable independently thereof, two gears meshing with said last named worm shaft, one of which has one less tooth than the other the gear having the greater number of teeth mounted rigidly upon its shaft, while the gear having the lesser number of teeth is mounted loosely thereon, and an indicator dial carried by said last named shaft, but adjustable thereon, substantially as described.

2. In a cyclometer the combination of a worm shaft carrying a sprocket wheel, a means on the wheel of the machine adapted to engage and move the sprocket one tooth for every revolution of the wheel, a gear meshing with said worm shaft, said gear itself mounted upon a worm shaft, a dial carried by said last named shaft but adjustable thereon, two gears meshing with said last named worm shaft one of which has one less tooth than the other, the gear having the greater number of teeth mounted rigidly upon its shaft, while the gear having the lesser number of teeth is mounted loosely thereon, and an indicator dial carried by said last named shaft but adjustable thereon, substantially as described.

3. A cyclometer for bicycles or velocipedes, comprising the supporting arm E, slotted as at $e$, and provided with two members E' E$^2$ and the frame F adjustably held between the free ends of said members E' and E$^2$, toothed or sprocket wheel J', a dial and pointer M', $f^3$, respectively, one whereof is stationary and the other whereof is suitably intergeared with the aforesaid sprocket wheel but is capable of being turned independently of the gear, other means and mechanism for adding and exhibiting the total number of miles traveled by the bicycle or velocipede wheel, and a finger or member $k^2$ to be carried by the velocipede wheel for actuating the aforesaid sprocket wheel, substantially as set forth.

4. A cyclometer for bicycles or velocipedes comprising a supporting piece or frame F with provision for connecting it to the bicycle or velocipede wheel, toothed or sprocket wheel J', a dial and pointer M', $f^3$, respectively, one whereof is stationary and the other whereof is suitably intergeared with the aforesaid sprocket wheel but is capable of being turned independently of the gearing, the arm K with its extension K$^3$ and finger $k^2$, the plate $k$ and screws $k'$, all capable of application and operation substantially as shown, for the purpose specified.

5. In a cyclometer the combination of a worm shaft carrying a sprocket wheel, an arm on the wheel of the machine adapted to engage and move the sprocket one tooth for every revolution of the wheel, a gear meshing with said worm shaft, said gear itself mounted upon a worm shaft, a dial on said last named shaft held by friction, two gears meshing with said last named worm shaft one of which has one less tooth than the other, the gear having the greater number of teeth mounted rigidly upon its shaft, while the gear having the lesser number of teeth is mounted loosely thereon, and an indicator dial held to said last named shaft by friction, substantially as described.

6. In a cyclometer the combination of the worm shaft carrying a sprocket wheel, an arm on the wheel of the machine adapted to engage and move the sprocket one tooth for every revolution of the wheel, a gear meshing with said worm shaft, said gear itself mounted upon a worm shaft, a dial on said last named shaft, held by friction, two gears meshing with said last named worm shaft, one of which has one less tooth than the other, the gear having the lesser number of teeth provided with a series of graduations on its face, the other gear provided with an opening through which the graduations on the gear having lesser number of teeth may be seen, said gear with the greater number of teeth mounted rigidly upon its shaft, while the other gear is mounted loosely thereon, and an indicator dial mounted on said last named shaft and held in place by friction, substantially as described.

In testimony whereof I sign this specification in the presence of two witnesses.

HENRY A. LOEW.

Witnesses:
W. H. CHAMBERLIN,
FLORENCE KING.